United States Patent [19]
Adams

[11] 3,904,115

[45] Sept. 9, 1975

[54] AUTOMOBILE RINSING TECHNIQUE WHICH ELIMINATES ENVIRONMENTALLY OBJECTIONABLE WASTE WATER STREAMS

[75] Inventor: Robert J. Adams, Youngstown, Ohio

[73] Assignee: The Standard Oil Company, Cleveland, Ohio

[22] Filed: Dec. 6, 1973

[21] Appl. No.: 422,276

Related U.S. Application Data

[63] Continuation-in-part of Ser. No. 401,147, Sept. 27, 1973, abandoned.

[52] U.S. Cl. .................. 239/8; 239/209; 134/36; 134/123
[51] Int. Cl. ..................... A01n 17/02; A62c 1/12
[58] Field of Search .................. 239/1, 8, 124, 209; 134/56, 112, 123, 10, 26, 36

[56] References Cited
UNITED STATES PATENTS

| | | | |
|---|---|---|---|
| 2,919,070 | 12/1959 | Arant | 134/36 |
| 3,259,138 | 7/1966 | Heinicke | 239/209 |
| 3,288,109 | 11/1966 | Smith, Jr. et al. | 239/209 |
| 3,432,346 | 3/1969 | Hurst | 134/32 |
| 3,451,094 | 6/1969 | Kywi | 134/123 |
| 3,470,023 | 9/1969 | Johnston | 134/36 |
| 3,504,858 | 4/1970 | Liddiard | 134/123 |

*Primary Examiner*—Lloyd L. King
*Attorney, Agent, or Firm*—Herbert D. Knudsen

[57] ABSTRACT

Environmentally objectionable waste streams caused by rinsing automobiles can be eliminated by using a small volume of rinse water sprayed onto the automobile surface at a nozzle outlet pressure of at least about 120 pounds per square inch.

5 Claims, No Drawings

AUTOMOBILE RINSING TECHNIQUE WHICH ELIMINATES ENVIRONMENTALLY OBJECTIONABLE WASTE WATER STREAMS

CROSS REFERENCE TO RELATED APPLICATION

The present application is a continuation-in-part of our prior application Ser. No. 401,147 filed Sept. 27, 1973 now abandoned.

BACKGROUND OF THE INVENTION

Many varieties of automobile washing devices are well known and used commercially throughout the world. These washing devices take many forms but invariably there are two steps: (a) washing step wherein an aqueous stream containing a surface active agent is contacted with the automobile surface to remove foreign matter from the surface and (b) a rinsing step wherein a stream of substantially pure water is sprayed onto the automobile surface to remove the surface active agent leaving a clean, soap-free surface. The present invention is related to this second rinsing step.

The rinsing step entails the spraying of substantially pure water onto the surface of the automobile from a plurality of nozzles adjacent to the automobile surface. The various devices and mechanisms for accomplishing such a spray is not altered by the present invention.

In the rinsing operation, low pressure, e.g. tap water pressure, streams are used. To accomplish adequate rinsing in an acceptable time frame about 30–40 gallons of water must be used to rinse one automobile. Such large volumes of water are costly, and more important, disposal of these contaminated streams has required excessive sewer capacity and is objectionable from an environmental standpoint. To solve this problem in the art, extensive reclamation systems have been devised which use filters, resin treatment and distillation to purify used rinse water so that it can be used again.

The present invention solves the environmental pollution problem of the rinse water without the use of reclamation devices. The present invention also reduces by manyfold the consumption of water by the rinse system. Importantly, these benefits are accomplished without sacrifice of the quality of the rinse.

SUMMARY OF THE INVENTION

It has been discovered in the process for washing an automobile surface consisting of at least the sides and top of the car comprising the steps of (a) applying water containing one or more surface active agents to the automobile surface to remove the dirt, grease and other foreign matter from the surface of the automobile and (b) rinsing the surface active agents from the automobile surface by spraying a substantially pure aqueous stream onto the automobile surface from a plurality of spray nozzles adjacent to the automobile surface, the improvement to the rinsing step comprising spraying the substantially pure aqueous stream onto the automobile surface from the spray nozzles at an outlet pressure of at least 120 pounds per square inch. Use of the present invention eliminates the undesirable waste stream from the rinse of automobile washing devices, and it reduces the consumption of water for the rinsing system manyfold without the use of expensive reclamation devices and without an adverse affect on the quality of the rinse.

The central aspect of the present invention is the outlet pressure of the water in the rinsing operation. The present invention entails no new device or combination of parts. Rather, the invention involves using a high-pressure spray in the rinsing operation. Accordingly, any equipment suitable for use in known systems can be used in the present invention so long as it can withstand the pressures involved.

As noted above, the outlet pressure at the spray nozzle must be at least about 120 pounds per square inch. This pressure is at least twice as high as normal tap water systems. While there is no theoretical upper limit on the pressure that can be employed, it has been found that the desirability of the rinse does not materially improve when pressures are increased beyond a certain point. Preferred outlet pressures are above 140 pounds per square inch, with 160 to 500 pounds per square inch being most preferred because of the proven effectiveness of these ranges.

The pressures suitably used within the range of the present invention vary widely, and are dependent to a large extent on the type of automobile rinsing system and amount of rinse water that is employed. For best results, a given amount of rinse water, for example, 3-4 gallons, is fed to a particular system, and the pressure applied to the rinse liquid is varied to obtain optimum results.

By the term "substantially pure aqueous stream" is meant the aqueous rinse streams normally used in car wash operations. These streams may be pure tap water, water containing a small but effective amount of a beading agent, such as wax or a hydrocarbon oil, or water containing any other additive used in car rinsing systems. The amount of the beading agent added to the rinse water varies, but usually less than 1 percent by volume, with amounts of less than one-half percent usually being effective. The use of a beading agent is especially desirable when a high velocity gas blown over the surface of the automobile is used for drying.

The amount of rinse water used in the invention is inversely proportional to the pressure and is also dependent upon the particular rinse system involved. As noted, the volume of water used in the rinse is dramatically reduced. Rather than using 30–40 gallons per rinse, now 3 or 4 gallons of rinse water do an equally commendable job. Of course, this manyfold reduction in water volume, permits very substantial savings in water costs.

At the pressures covered by the present invention, the volume of the rinse is preferably less than about 20 gallons per automobile, with volumes of less than 10 gallons per automobile being especially preferred. Use of these small volumes of rinse in the invention gives not only substantial savings in water consumption, but also savings in capital and operating expense associated with the heating of rinse water, substantial savings in sewer use fees and savings in chemicals consumption when a beading agent is added to the rinse system.

One highly desirable feature of the present invention is the fact that the technique of the invention can be applied to any conventional system whether it is presently installed or not. All that is required for conversion of an installed system to the present invention is the pressurization of the rinse feed system and changing of the rinse spray nozzles to effect a smaller volumetric flow. Most systems are constructed of materials that can readily withstand the pressures and temperatures of the rinse operation of the invention.

The conditions of rinsing operation of the present invention are not critical. The temperatures of the rinse normally range from about 10° to about 90°C. The nozzle configuration and design may vary widely and the particular automobile wash system is not critical. The central focus of the invention is the outlet pressure of the rinse water; when this pressure is maintained above about 120 pounds per square inch, the desirable results of the present invention are obtained.

SPECIFIC EMBODIMENTS

COMPARATIVE EXAMPLE AND EXAMPLE 1 — Comparison of low volume-low pressure rinse with low volume-high pressure rinse.

A commercial rinsing device used in an automobile washing operation was used for the experiments. This system consisted of a fixed arch through which the automobile is pulled. The arch had eight spray nozzles spaced evenly around the arch and directed toward the surface of the automobile. The flow of the spray from the spray nozzles was directed approximately 10° away from perpendicular in the direction opposite of the direction of travel of the automobile. Surface active agent was thereby always washed away from the rinsed surface toward the unrinsed portion of the vehicle.

An arbitrary flow rate of 4 gallons per automobile was chosen. A standard size sedan was washed using a detergent composition specifically designed for automobile washing devices. The automobile washed in this operation was then run at normal speed through the rinse operation where the 4 gallons of rinse water were sprayed onto the automobile surface.

The automobile was rinsed with tap water containing one ounce of wax having an outlet pressure of about 50 pounds per square inch. The rinsed automobile was observed in bright daylight. Immediately upon exit from the rinse operation, visual observation indicated the presence of soap residue. Upon drying in high-velocity air, the automobile surface was observed to have a very large number of soap stains and the cleaned automobile surface was clearly unacceptable from a commercial point of view.

Using exactly the same system and conditions, the sedan was again passed through the washing cycle. The rinse was conducted using only four gallons of rinse water containing one ounce of wax, but the outlet pressure of the spray nozzles was raised to 400 pounds per square inch. Immediately after the rinse operation, the wet surface of the automobile was examined and no residue of soap was observed. Upon drying, the surface of the automobile was again examined visually, and it was determined that the cleaned surface of the automobile was just as good as or better than the normal wash operation which uses about 40 gallons of water sprayed at about 50 pounds per square inch.

EXAMPLE 2 — Other high pressure-low volume rinses.

In the same manner as described in Example 1, a washed automobile was rinsed using 4 gallons of water sprayed at an outlet pressure of 180 pounds per square inch. A very desirable rinsed surface was obtained that was at least as good as the normal rinse operation. A number of automobiles ranging from compacts to station wagons were washed in the normal manner and rinsed according to the invention using three to four gallons of rinse sprayed at pressures between 180 and 400 pounds per square inch. Very desirable rinsing action was observed.

EXAMPLE 3 — Monitoring the rinse effluent.

The rinse operation was observed over the rinsing of approximately 20 automobiles using the conditions of Example 1. All rinses gave commercially acceptable finishes.

All excess water from the rinses was collected and fed to the wash liquid reservoir for subsequent use in the washing operation. In view of the amount of water taken out by the washed automobile, an average of an additional threefourths of a gallon of tap water had to be added to the wash reservoir. There was no liquid effluent from the car wash operation that required disposal in a sewer or reclamation.

For a conventional low-pressure, large-volume wash, such recycling cannot be used because recycle of the used rinse water to the wash system would cause an overflow of the wash reservoir. If 4 gallons of water are taken out per automobile, only 4 gallons are required for make-up in the wash reservoir. It is seen that recycle of 40 gallons of water to satisfy a 4-gallon deficiency leaves 36 gallons of water that must be placed in the sewer or reclaimed.

Using the present invention, it is possible by appropriate adjustment of the nozzle outlet pressure in the rinse system and adjustment of the volume of rinse liquid to balance the loss of water from the car wash system, i.e., that amount of water taken out with the automobile and by other means, with the amount of water fed to the rinse system thereby making it unnecessary to add tap water to the wash reservoir. In such a system, the volume of rinse water recycled would equal the volume of liquid lost in the car wash operation.

I claim:

1. In the process for washing an automobile surface consisting of at least the sides and top of the car comprising the steps of (a) applying water containing one or more surface active agents to the automobile surface to remove the dirt, grease and other foreign matter from the surface of the automobile and (b) rinsing the surface active agents from the automobile surface by spraying a substantially pure aqueous stream onto the automobile surface from a plurality of spray nozzles adjacent to the automobile surface, the improvement to the rinsing step comprising spraying the substantially pure aqueous stream onto the automobile surface from the spray nozzles at an outlet pressure of at least 120 pounds per square inch using less than about 20 gallons of water per automobile.

2. The process of claim 1 wherein the outlet pressure is between about 160 and about 500 pounds per square inch.

3. The process of claim 1 wherein the water sprayed onto the automobile surface in the rinsing step is collected as it falls from the automobile surface and is recycled to step (a).

4. The process of claim 3 wherein the amount of water recycled is substantially equal to the amount of water leaving the washing step and the rinsing step.

5. The process of claim 1 wherein the rinse liquid contains a small but effective amount of a beading agent.

* * * * *